US012392174B2

(12) United States Patent
Och et al.

(10) Patent No.: US 12,392,174 B2
(45) Date of Patent: Aug. 19, 2025

(54) DEVICE FOR SWITCHING AND ACTUATING MULTIPLE FUNCTIONS OF A CHARGING AND/OR FILLER-NECK COMPARTMENT SYSTEM OF A VEHICLE, AND CHARGING AND/OR FILLER-NECK COMPARTMENT SYSTEM HAVING SUCH A DEVICE

(71) Applicant: ILLINOIS TOOL WORKS INC., Glenview, IL (US)

(72) Inventors: Roland Och, Rottendorf (DE); Matthias Hegwein, Ippesheim (DE); Andreas Rudolf, Eibelstadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 747 days.

(21) Appl. No.: 17/674,368

(22) Filed: Feb. 17, 2022

(65) Prior Publication Data
US 2022/0268066 A1 Aug. 25, 2022

(30) Foreign Application Priority Data
Feb. 23, 2021 (DE) ...................... 10 2021 104 304.2

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05B 79/20* (2013.01); *E05B 81/13* (2013.01);
(Continued)

(58) Field of Classification Search
CPC .......... E05B 83/34; E05B 79/20; E05B 81/13; E05B 81/36; E05B 81/44; E05B 81/42;
(Continued)

(56) References Cited

U.S. PATENT DOCUMENTS 6,318,771 B1 * 11/2001 Holloway ............... B60K 15/05
292/201
2009/0260716 A1 * 10/2009 Baudoux ............ B60K 15/0406
141/350

(Continued)

FOREIGN PATENT DOCUMENTS

CN       109964373 A  *  7/2019  ............... B60K 1/04
CN       118728217 A  * 10/2024  ............ E05F 15/614
(Continued)

*Primary Examiner* — Amy R Weisberg
*Assistant Examiner* — Wenwei Zhuo
(74) *Attorney, Agent, or Firm* — THOMPSON HINE LLP (57) ABSTRACT

A device for switching and actuating multiple functions of a charging and/or filler-neck compartment system having a charging and/or filler-neck compartment and a cover which is movable relative to the charging and/or filler-neck compartment. The device has a drive element with a drive shaft, wherein the drive shaft is operatively connected to the cover such that, when the drive shaft rotates, the cover is movable relative to the charging and/or filler-neck compartment. The device furthermore has a mechanical control or switching mechanism, in particular in the form of or with a gearing mechanism, wherein the mechanical control or switching mechanism is designed such that, when the drive shaft rotates, a rotational movement of the drive shaft can be picked off by the mechanical control or switching mechanism for the purposes of manipulating at least one functional component of the charging and/or filler-neck compartment system as required.

16 Claims, 6 Drawing Sheets

(51) Int. Cl.
*E05B 79/20* (2014.01)
*E05B 81/12* (2014.01)
*E05B 81/36* (2014.01)
*E05B 81/44* (2014.01)

(52) U.S. Cl.
CPC ............... *B60K 2015/0515* (2013.01); *B60K 2015/0561* (2013.01); *E05B 81/36* (2013.01); *E05B 81/44* (2013.01); *E05Y 2900/534* (2013.01)

(58) Field of Classification Search
CPC . E05Y 2900/534; F16H 37/122; B60K 15/05; B60K 15/0409; B60K 2015/0515; B60K 2015/0561; B60K 2015/0507
USPC ..... 296/97.22; 70/255, 244; 74/25, 27, 3.52, 74/567, 569, 55; 220/DIG. 33, 86.2, 315
See application file for complete search history.

(56) References Cited

U.S. PATENT DOCUMENTS

| | | |
|---|---|---|
| 2011/0174102 A1 | 7/2011 | Beck |
| 2012/0222356 A1 | 9/2012 | Beck |
| 2014/0084599 A1 | 3/2014 | Beck |
| 2015/0061314 A1 | 3/2015 | Beck |
| 2016/0326777 A1* | 11/2016 | Wagner .................. F16H 25/125 |
| 2020/0122570 A1 | 4/2020 | Sha |
| 2022/0186542 A1* | 6/2022 | Wietkamp ............. B60K 15/05 |
| 2024/0001760 A1* | 1/2024 | Tani ....................... B60K 15/05 |
| 2024/0384586 A1* | 11/2024 | Tanaka .................... E05B 83/34 |

FOREIGN PATENT DOCUMENTS

| | | | | |
|---|---|---|---|---|
| CN | 119674607 A | * | 3/2025 | |
| DE | 102008057933 B4 | | 7/2010 | |
| DE | 102009060119 A1 | | 6/2011 | |
| DE | 102011101838 A1 | | 11/2012 | |
| DE | 102012004078 A1 | | 9/2013 | |
| DE | 102019128551 A1 | | 4/2020 | |
| DE | 102020209609 A1 | * | 12/2021 | ............. B60K 15/05 |
| DE | 102023100577 A1 | * | 7/2023 | ............. B60L 53/16 |
| WO | WO 2010058304 A1 | | 5/2010 | |
| WO | WO 2012158916 A1 | | 11/2012 | |
| WO | WO-2021204429 A1 | * | 10/2021 | ............. B60K 15/05 |

* cited by examiner

DEVICE FOR SWITCHING AND ACTUATING MULTIPLE FUNCTIONS OF A CHARGING AND/OR FILLER-NECK COMPARTMENT SYSTEM OF A VEHICLE, AND CHARGING AND/OR FILLER-NECK COMPARTMENT SYSTEM HAVING SUCH A DEVICE

TECHNICAL FIELD

The present invention relates generally to actuating devices for opening and closing a cover in or on a vehicle. Specifically, the invention relates in particular to devices for switching and actuating multiple functions or functional components of a charging and/or filler-neck compartment system of a vehicle, wherein the charging and/or filler-neck compartment system has a charging and/or filler-neck compartment and a cover which is movable relative to the charging and/or filler-neck compartment.

BACKGROUND

Actuating devices for opening and closing a cover in or on a vehicle are generally known from the prior art, for example from DE 10 2008 057 933 B4, DE 10 2009 060 119 A1, DE 10 2011 101 838 A1 and DE 10 2012 004 078 A1.

In the actuating device known from publication DE 10 2009 060 119 A1, for example, a push-push kinematics, with a simultaneous rotational movement of the tappet and the engagement of at least one protrusion on the inner circumference of a housing of the actuating device into the groove, is effected. The known actuating device is characterized by a small number of components and thus a robust and cost-efficient construction. At the same time, it reliably ensures the required locking and unlocking, for example of a tank flap or charging flap, at all times. In addition, it can be combined with a central locking function.

In the prior art, however, there is a fundamental need for charging and/or filler-neck compartment systems in which several functions must be switched and actuated in a coordinated manner. These functions include, in particular, the unlocking and locking or releasing and blocking of the cover using a flap unlocking/flap locking mechanism, moving the unlocked cover relative to the charging and/or filler-neck compartment such that the cover is transferable from a closed position into an open position (and vice versa), locking and/or blocking a charging connection, charging plug connector, and/or filler neck of the charging and/or filler-neck compartment system, and, in accordance with requirement, other functions such as enabling and disabling an illumination device, which serves to illuminate at least one region of the charging and/or filler-neck compartment in its open state.

These different functions or functional components of the charging and/or filler-neck compartment system must be controlled or manipulated in coordination with respect to time. For example, during a charging operation, the cover is first to be unlocked in its closed state using the flap unlocking/flap locking mechanism of the charging and/or filler-neck compartment system, wherein the cover can be moved relative to the charging and/or filler-neck compartment only after the release of the cover in order to be transitioned into the open state. Only then can the charging connection or charging plug connector be connected and thereafter locked.

To manipulate and coordinate these functions or functional components, it is common to associate multiple actuators with the charging and/or filler-neck compartment system, wherein each actuator takes over the actuation of a correspondingly associated functional component, such as driving the flap unlocking/flap locking mechanism, moving the unlocked flap relative to the charging and/or filler-neck compartment, and locking and/or blocking the charging connection or charging plug connector. A control device is typically used in order to coordinate the operation of the various functional components of the charging and/or filler-neck compartment system, which control device drives the respective actuators in a coordination manner.

On the other hand, a relatively small amount of space is typically available in a vehicle for the integration of the charging and/or filler-neck compartment system. This limitation usually limits the number of implementable functions or functional components of a charging and/or filler-neck compartment system.

SUMMARY

Accordingly, the underlying problem addressed by the invention is to further develop an actuating device of the above-mentioned type in such a way that it has a relatively small construction space requirement, wherein at the same time several functions or functional components of the charging and/or filler-neck compartment system can be controlled in a reliable and coordinated manner. In addition, despite its compact design, it is desired to reduce the manufacturing costs of the actuating device.

Accordingly, the invention relates to a device for switching and actuating multiple functions or functional components of a charging and/or filler-neck compartment system of a vehicle, wherein the charging and/or filler-neck compartment system has a charging and/or filler-neck compartment and a cover which is movable relative to the charging and/or filler-neck compartment.

The device according to the invention is in particular characterized in that it comprises an (in particular a single) drive element having a drive shaft, for example in the form of an electromotive actuator, wherein the drive shaft of the drive element is operatively connected to the cover of the charging and/or filler-neck compartment system in order to be able to move the cover of the charging and/or filler-neck compartment system relative to the charging and/or filler-neck compartment system in accordance with requirement.

The device according to the invention also comprises a mechanical control or switching mechanism operatively connected to the drive shaft of the drive element, for example in the form of a gearing mechanism, which is configured in order to pick off a rotational movement from the drive shaft when the drive shaft of the drive element rotates in order to manipulate at least one (further) functional component of the charging and/or filler-neck compartment system in accordance with requirement.

For example, it is conceivable that the mechanical control or switching mechanism is designed to, when the drive shaft of the drive element rotates, convert a torque generated by the drive element into a preferably translational force in accordance with requirement for the purposes of manipulating, with the aid of this preferably translational force, at least one (further) functional component of the charging and/or filler-neck compartment system in accordance with requirement.

This at least one further functional component is, for example, a flap unlocking/flap locking mechanism of the charging and/or filler-neck compartment system that is used in order to lock or block the cover of the charging and/or filler-neck compartment system in its closed state, or, in accordance with requirement, to unlock or release the cover that is locked in the closed state when a charging or filling operation is to be initiated.

As a further example of a functional component to be manipulated with the aid of the gearing mechanism operatively connected to the second output shaft of the drive element, a locking/unlocking mechanism is mentioned, which, in accordance with requirement, locks and/or blocks a charging connection, charging plug connector, and/or filler neck accommodated in a passage opening of the charging and/or filler-neck compartment.

As a further example of a functional component of the charging and/or filler-neck compartment system to be manipulated by the second output shaft of the drive element and which is operatively connected to the second output shaft of the gearing mechanism, an illumination device of the charging and/or filler-neck compartment system is mentioned, which is associated with a corresponding switch for activating or deactivating the illumination device in accordance with requirement.

Of course, the above list of functions or functional components of the charging and/or filler-neck compartment system, which can be manipulated in accordance with requirement with the aid of the mechanical control or switching mechanism, cannot be considered limiting.

The advantages achievable with the device according to the invention are obvious: in that a single drive element, such as a single electromotive drive, can be provided in order to not only move the cover relative to the charging and/or filler-neck compartment in accordance with requirement but also to manipulate further functions or functional components of the charging and/or filler-neck compartment system as needed, the number of actuators to be provided in the overall charging and/or filler-neck compartment system is reduced to a minimum. This results in a particularly inexpensive and compact set-up of the entire charging and/or filler-neck compartment system. At the same time, manufacturing costs can also be reduced while still ensuring extensive functionality of the charging and/or filler-neck compartment system.

Advantageously, the mechanical control or switching mechanism of the device according to the invention, which is operatively connected to the drive shaft of the drive element, is configured in order to coordinate the manipulation of the at least one (further) functional component of the charging and/or filler-neck compartment system according to a preset or presettable event sequence, in particular with the movement of the cover relative to the charging and/or filler-neck compartment.

In other words, according to this advantageous further development of the invention, it is ensured, for example, that during a charging and/or filling operation with the aid of the gearing mechanism, a flap unlocking/flap locking mechanism is first manipulated such that the cover of the charging and/or filler-neck compartment system, which is (still) in its closed state, is unlocked accordingly.

Only after the release of the cover has been carried out is it moved with the aid of the drive element relative to the charging and/or filler-neck compartment and thus transferred from its closed state to an open position.

As a further functional component that is to be manipulated by the mechanical control or switching mechanism in a coordinated manner, a locking/unlocking mechanism is mentioned, which does not release a charging connection, charging plug connector, and/or filler neck of the charging and/or filler-neck compartment system until the cover has been moved to its open position.

In order to implement this coordinated manipulation of the at least one (further) functional component with the movement of the cover relative to the charging and/or filler-neck compartment, according to embodiments of the device according to the invention, the mechanical control or switching mechanism is configured in order to manipulate the at least one (further) functional component depending on a rotational angle of the second output shaft of the drive element.

As already suggested, according to embodiments of the present invention, the charging and/or filler-neck compartment system comprises a flap unlocking/flap locking mechanism in order to lock or block or, in accordance with requirement, to unlock or release the cover in its closed state (closing position), wherein the mechanical control or switching mechanism is preferably configured in order to convert, upon rotation of the second output shaft of the drive element, a torque generated by the drive element into a preferably translational force, which serves as an actuating force for manipulating the flap unlocking/flap locking mechanism.

Alternatively or additionally, according to embodiments of the present invention, the charging and/or filler-neck compartment system can comprise a charging connection received in a passage opening of the charging and/or filler-neck compartment, charging plug connector, and/or filler neck and having a correspondingly associated locking/unlocking mechanism, wherein this locking/unlocking mechanism associated with the charging connection, charging plug connector, and/or filler neck is configured in order to lock or block the charging connection, charging plug connector and/or filler neck in accordance with requirement. Here, the mechanical control or switching mechanism is preferably configured in order to convert a torque generated by the drive element into a preferably translational force, which serves as the actuating force for the manipulation of the locking/unlocking mechanism upon rotation of the drive shaft of the drive element in accordance with requirement.

Alternatively or additionally, the charging and/or filler-neck compartment system can comprise an illumination device with a correspondingly assigned switch, wherein this switch serves for the activation and deactivation of the illumination device in accordance with requirement. The mechanical control or switching mechanism is preferably configured in order to convert a torque generated by the drive element into a preferably translational force when rotating the drive shaft of the drive element, which is used in order to manipulate the switch in accordance with requirement.

In particular, the mechanical control or switching mechanism can be designed to coordinate the manipulation of the at least one functional component, in accordance with a preset or presettable event sequence, with the movement of the cover relative to the charging and/or filler-neck compartment, wherein the mechanical control or switching mechanism is in particular preferably designed to move the cover relative to the charging and/or filler-neck compartment, and/or manipulate the at least one functional component, in a manner dependent on a rotational angle and/or a number of rotations of the drive shaft.

According to implementations of the device according to the invention, the charging and/or filler-neck compartment system has a flap unlocking/flap locking mechanism for locking or blocking the cover in its closed state, wherein the mechanical control or switching mechanism is designed to, when the drive shaft of the drive element rotates, in particular in accordance with a preset or presettable event sequence, convert a torque generated by the drive element into a preferably translational force for the purposes of manipulating the flap unlocking/flap locking mechanism in accordance with requirement.

Alternatively or additionally, the charging and/or filler-neck compartment system can have a charging connection, charging plug connector and/or filler neck accommodated in a passage opening of the charging and/or filler-neck compartment and has a correspondingly associated locking/unlocking mechanism for locking/blocking or unlocking/releasing the charging connection, charging plug connector and/or filler neck in accordance with requirement, wherein the mechanical control or switching mechanism is designed to, when the drive shaft of the drive element rotates, in particular in accordance with a preset or presettable event sequence, convert a torque generated by the drive element into a preferably translational force for the purposes of manipulating the locking/unlocking mechanism in accordance with requirement.

Alternatively or additionally, the charging and/or filler-neck compartment system can have an illumination device with a correspondingly associated switch for activating and deactivating the illumination device in accordance with requirement, wherein the mechanical control or switching mechanism is designed to, when the drive shaft of the drive element rotates, in particular in accordance with a preset or presettable event sequence, convert a torque generated by the drive element into a preferably translational force for the purposes of manipulating the switch in accordance with requirement.

In accordance with further developments of the aforementioned embodiments, the mechanical control or switching mechanism is designed to generate the force required for manipulating the flap unlocking/flap locking mechanism and/or the force required for manipulating the locking/unlocking mechanism and/or the force required for manipulating the switch in a manner dependent on a rotational angle and/or a number of rotations of the drive shaft of the drive element, wherein the mechanical control or switching mechanism is in particular designed to generate the force required for manipulating the flap unlocking/flap locking mechanism and the force required for manipulating the locking/unlocking mechanism and the force required for manipulating the switch in each case in a manner dependent on a rotational angle and/or a number of rotations of the drive shaft of the drive element.

According to preferred implementations of the solution according to the invention, the drive shaft is operatively connected to the cover and the mechanical control or switching mechanism is designed such that, proceeding from an initial position of the drive shaft, during a first number of rotations or through a first rotational angle of the drive shaft, the mechanical control or switching mechanism generates a force required for manipulating the flap unlocking/flap locking mechanism, that, only after the first number of rotations or after the first rotational angle of the drive shaft and preferably only during an in particular immediately subsequent second number of rotations or through a second rotational angle of the drive shaft, the cover is moved relative to the charging and/or filler-neck compartment, and that, only after the second number of rotations or only after the second rotational angle of the drive shaft and during an in particular immediately subsequent third number of rotations or through a third rotational angle of the drive shaft, the mechanical control or switching mechanism generates a force required for manipulating the locking/unlocking mechanism.

In further developments of this aspect, it is provided that the drive shaft is operatively connected to the cover and the mechanical control or switching mechanism is designed such that, during a fourth number of rotations, which is in particular immediately subsequent to the third number or the third rotational angle, or through a fourth rotational angle of the drive shaft, the mechanical control or switching mechanism again generates a force required for manipulating the locking/unlocking mechanism, that, only after the fourth number of rotations or only after the fourth rotational angle of the drive shaft and preferably only during an in particular immediately subsequent fifth number of rotations or through a fifth rotational angle of the drive shaft, the cover is again moved relative to the charging and/or filler-neck compartment, and that, during an in particular immediately subsequent sixth number of rotations or through a sixth rotational angle of the drive shaft, the mechanical control or switching mechanism again generates a force required for manipulating the flap unlocking/flap locking mechanism.

The drive shaft changes its direction of rotation, in particular after reaching the third rotational angle, so that, in terms of the amount, the fourth rotational angle then corresponds to the third rotational angle, the fifth rotational angle corresponds to the second rotational angle, and the sixth rotational angle corresponds to the first rotational angle.

Various solutions are possible for implementing the gearing mechanism:

According to a particularly easily realized but nevertheless effective embodiment of the present invention, the mechanical control or switching mechanism has a gearing mechanism which is designed in particular as a coupling gearing and which has a crank and a rocker, wherein the crank is driven or drivable in rotation by the drive shaft of the drive element, and wherein a coupling between the crank and the rocker is at least intermittently produced or eliminated in a manner dependent on a rotational angle of the crank.

Alternatively, the mechanical control or shift mechanism comprises a gearing mechanism having at least one rotatably mounted cam carrier that is driven or drivable in rotation by the output shaft of the drive element upon actuation of the drive element.

In this embodiment, it is preferably provided that the gearing mechanism further comprises at least one pick-off element mounted with respect to the at least one rotatably mounted curve carrier such that said at least one pick-off element continuously follows the at least one rotatably mounted curve carrier in order to generate a force necessary for manipulating at least one functional component of the charging and/or filler-neck compartment system.

According to advantageous configurations of this embodiment of the gearing mechanism, the gearing mechanism preferably has a correspondingly associated pick-off element for each functional component of the charging and/or filler-neck compartment system to be manipulated, which pick-off element is mounted with respect to the at least one rotatably mounted cam carrier such that it continuously follows the at least one rotatably mounted cam carrier in order to generate a corresponding output motion, which is used in order to manipulate at least one functional component.

Preferably, the at least one pick-off element is connected to a corresponding force-transmitting element in order to transfer tensile and/or compressive forces from the at least one pick-off element to the functional component to be manipulated in accordance with requirement. Various embodiments can be considered as a force-transmitting element, such as a rod, a cable pull, and/or a Bowden cable.

In order to achieve that the at least one pick-off element can continuously follow the at least one rotatably mounted cam carrier, it is provided in accordance with further developments of the present invention that a preloading element, in particular in the form of a compression spring, is associated with the at least one pick-off element in order to preload the pick-off element towards the cam carrier.

According to embodiments of the at least one rotatably mounted cam carrier of the gearing mechanism, it is provided that the at least one rotatably mounted cam carrier is configured as at least one cam disk.

In particular, according to preferred implementations of the gearing mechanism, it is provided that the at least one cam carrier comprises at least one driver, wherein the gearing mechanism further comprises at least one driver element that is preferably at least regionally of complementary design with respect to the at least one driver and is associated with the at least one driver.

It lends itself here that the at least one driver element associated with the at least one driver is mounted and arranged with respect to the at least one cam carrier such that the at least one driver element is only engaged with the associated driver in a preset or presettable rotational angle range of the at least one cam carrier.

For this purpose, for example, a positive guide can be associated with the at least one drive element in order to guide a movement of the drive element when the driver associated with the at least one cam carrier is taken along by the driver associated with the at least one drive element in the preset or presettable rotational angle range upon rotation of the at least one cam carrier. For example, a slotted or sliding-block guide can be considered as the positive guide.

According to preferred implementations of the last mentioned embodiment, the positive guide has a free movement region in which the driver element associated with the at least one driver is held (held in free movement) when the driver element is not in engagement with the at least one associated driver.

As also described in the context of the at least one pick-off element, it lends itself that the at least one driver element is connected to a corresponding force-transmitting element in order to transfer tensile and/or compressive forces from the at least one driver element to the functional component to be manipulated in accordance with requirement. For example, a rod, a cable pull, and/or a Bowden cable can be considered as a force-transmitting element.

According to particularly preferred realizations of the solution according to the invention, it is provided that, in an initial rotational position of the at least one rotatably mounted cam carrier, the at least one driver element is engaged with the at least one driver of the cam carrier and the at least one pick-off element lies, in a first position, against an edge region of the cam carrier.

During a rotation of the rotatably mounted cam carrier through a first rotational angle range and proceeding from the aforementioned initial rotational position, the at least one driver element is driven along by the associated driver and is transferred into a free movement region of the positive guide while the at least one pick-off element remains in its first position against the edge region of the cam carrier.

During a further rotation of the rotatably mounted cam carrier through a second rotational angle range, the at least one driver element remains in the free movement region of the positive guide whereas the at least one pick-off element lies, in a second position, against an edge region of the cam carrier, wherein the second position is different from the first position.

During a further rotation of the rotatably mounted cam carrier through a third rotational angle range, the at least one driver element lies in the free movement region of the positive guide, wherein the at least one pick-off element lies, again in the first position, against the edge region of the cam carrier.

In this context, it is conceivable, for example, that the at least one rotatably mounted cam carrier of the gearing mechanism is designed as at least one cam disk which has a first region with a non-uniform edge, the contour of which is continuously followed by the at least one pick-off element when the cam carrier designed as a cam disk rotates, wherein the cam carrier of the gearing mechanism designed as a cam disk has a second region preferably with a uniform edge, wherein the at least one driver is formed in the second region.

The present invention does not only relate to a device for switching and actuating a plurality of functions or functional components of a charging and/or filler-neck compartment system using a (single) drive element, but rather also relates to a charging and/or filler-neck compartment system for a vehicle, wherein said charging and/or filler-neck compartment system comprises a charging and/or filler-neck compartment and a cover that is movable relative to the charging and/or filler-neck compartment, and wherein said charging and/or filler-neck compartment according to the invention comprises a device for switching and actuating multiple functions or functional components of the charging and/or filler-neck compartment system.

BRIEF DESCRIPTION OF THE DRAWINGS

Referring now to the accompanying drawings, exemplary embodiments of the device according to the invention for switching and actuating multiple functions or functional components of a charging and/or filler-neck compartment system of a vehicle will be described.

The following are shown.

DETAILED DESCRIPTION

Vehicles having a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging connection that is accessible from the outside on the vehicle body and is typically a charging socket, by connecting to an electrical charging station, for example, or a conventional home electrical terminal.

The charging connection is usually disposed in a charging recess of the vehicle body, which is generally covered or closed by a cover serving as a closure element. A mechanism that cooperates with the cover optionally allows the charging recess to be opened and closed or the cover to be flipped open and closed relative to the charging recess, and thus allows access to the charging connection.

With the aim of being able to manipulate multiple functions or functional components of a charging and/or filler-neck compartment system of a vehicle (i.e. switching and/or actuating) in a coordinated manner in as compact a construction as possible in accordance with requirement, it is provided in the exemplary embodiment of the device 1 according to the invention shown in the drawings that said device comprises a drive element 2, for example in the form of an electromotive drive, wherein said drive element 2 comprises a drive shaft (not explicitly shown in the drawings), which is operatively connected to the cover (not shown in the drawings) via a drive shaft 3 in order to move the cover relative to the charging and/or filler-neck compartment of the charging and/or filler-neck compartment system in accordance with requirement.

The exemplary embodiment of the device 1 according to the invention shown in FIG. 1 to FIGS. 4A-4D further comprises a gearing mechanism 5 operatively connected to the drive shaft 3 of the drive element 2. The construction and functionality of this gearing mechanism 5 will be described in further detail below with respect to the illustrations in FIG. 1 to FIGS. 4A-4D.

Specifically, the gearing mechanism 5 is designed to, when the drive shaft 3 of the drive element 2 rotates, convert a torque generated by the drive element 2 into a preferably translational force in accordance with requirement for the purposes of manipulating at least one function or functional component of the charging and/or filler-neck compartment system in accordance with requirement.

As will be described in further detail below with respect to the exemplary embodiment shown in FIG. 1 to FIGS. 4A-4D, the gearing mechanism 5 is in particular configured in order to coordinate manipulation of the at least one functional component of the charging and/or filler-neck compartment system with the movement of the cover relative to the charging and/or filler-neck compartment according to a preset or presettable event sequence.

In particular, the gearing mechanism 5, whose construction and functionality is described below in particular with respect to the illustrations in FIG. 3A to FIG. 3D, and in FIG. 4A to FIG. 4D, is configured in order to coordinate the manipulation of the at least one functional component of the charging and/or filler-neck compartment system according to a preset or presettable event sequence with a movement of the cover relative to the charging and/or filler-neck compartment.

For this purpose, the gearing mechanism 5 of the embodiment shown schematically in the enclosed drawings comprises a rotatably mounted cam carrier 6, which is driven or drivable in rotation when the drive element 2 is actuated by the drive shaft 3 of the drive element 2.

In the exemplary embodiment of the gearing mechanism 5 shown in the drawings, the latter further comprises a pick-off element 7, which is mounted such that it preferably continuously follows the rotatably mounted cam carrier 6 to generate an output movement, i.e. a force necessary to manipulate a functional component.

In this context, in particular, it is provided that the pick-off element 7 comprises a force-transmitting element 10 (here, in the form of a Bowden cable) in order to transfer tensile and/or compressive forces from the pick-off element 7 to the functional component to be manipulated in accordance with requirement.

As can be seen in particular from the illustrations in FIG. 4A to FIG. 4D, a preloading element 11 in the form of a compression spring is associated with the pick-off element 7 in order to bias the pick-off element 7 towards the curve beam 6. In this way, it is ensured that the pick-off element 7 continuously follows the cam carrier 6 in order to generate an output movement.

It is further provided in the exemplary embodiment shown in the drawings that the cam carrier 6 has a driver 9, and the gearing mechanism 5 furthermore has at least one driver element 8 which is preferably at least regionally of complementary design with respect to the driver 9 and which is associated with the driver 9, wherein this driver element 8 is mounted and arranged in relation to the cam carrier 6 such that the driver element 8 is in engagement with the associated driver 9 only in a preset or presettable rotational angle range of the cam carrier 6.

For this purpose, a positive guide 12 is associated with the driver element 8 in order to guide a movement of the driver element 8 when it is taken along by the associated driver element 9 in the preset or presettable rotational angle range with the rotation of the cam carrier 6, wherein the positive guide 12 is preferably embodied as a slotted or sliding-block guide.

As shown in the illustrations in FIG. 3A to FIG. 3D, the positive guide 12 comprises a free movement region 13 in which the driver element 8 associated with the driver 9 is held when the driver element 8 is not in engagement with the associated driver 9.

Furthermore, in the exemplary embodiment of the gearing mechanism 5 according to the invention shown in the drawings, it is provided that the driver element 8 is connected to a force-transmitting element 10 in the form of a Bowden cable in order to transfer tensile and/or compressive forces from the drive link 8 to the functional component to be manipulated in accordance with requirement.

In an initial rotational position of the rotatably mounted cam carrier 6 of the gearing mechanism 5, which is illustrated in FIG. 1, FIG. 2, FIG. 3A, and FIG. 4A, the driver element 8 is engaged with the driver 9 of the cam carrier 6, while the pick-off element 7 lies, in a first position, against an edge region of the cam carrier 6.

Figure 1:
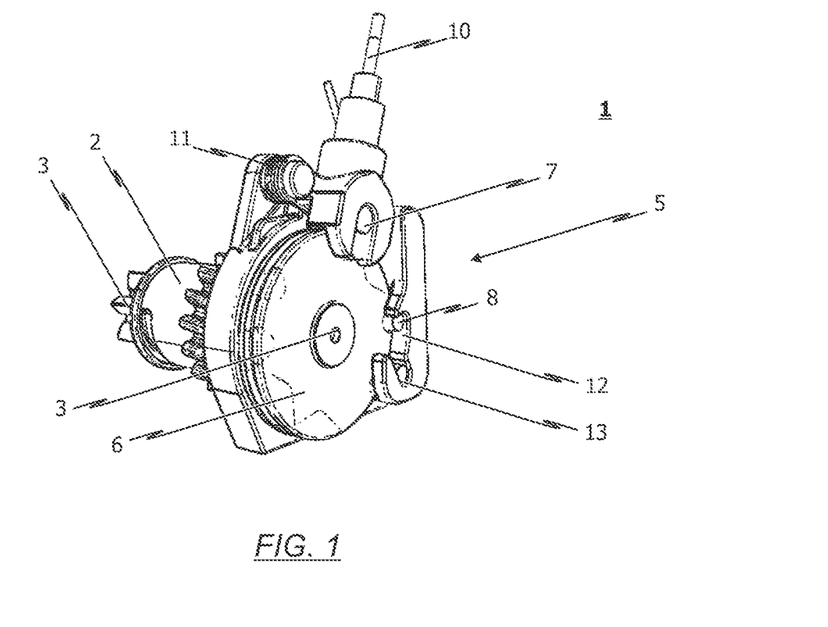
FIG. 1 schematically and in a first isometric view, an exemplary embodiment of the device according to the invention for switching and actuating multiple functions or functional components of a charging and/or filler-neck compartment system of a vehicle, namely in a state in which the gearing mechanism of the device according to the invention is in an initial rotational position.
Figure 2:
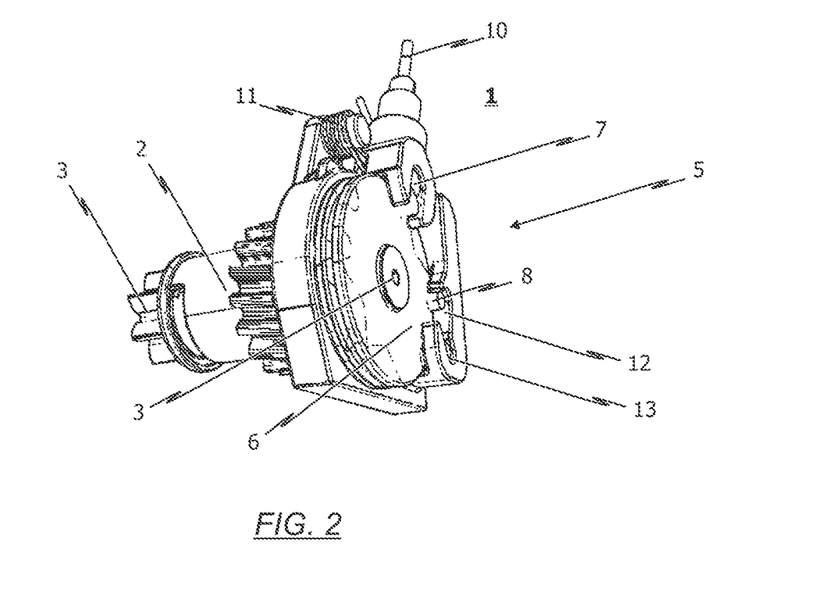
FIG. 2 schematically and in a second isometric view, the exemplary embodiment of the device according to the invention in which the gearing mechanism is in an initial rotational position.
Figure 3A:
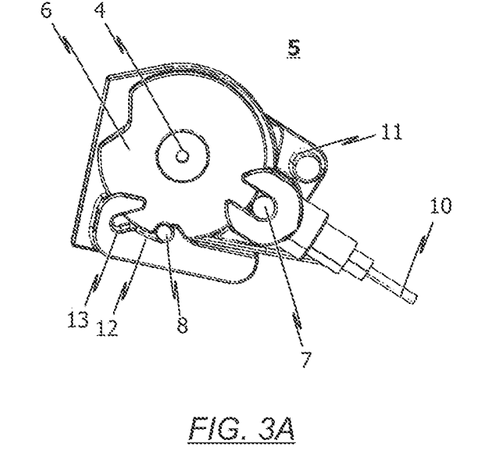
FIG. 3A schematically, a plan view of the gearing mechanism of the exemplary embodiment of the device according to the invention, wherein the gearing mechanism is in an initial rotational position.
Figure 3B:
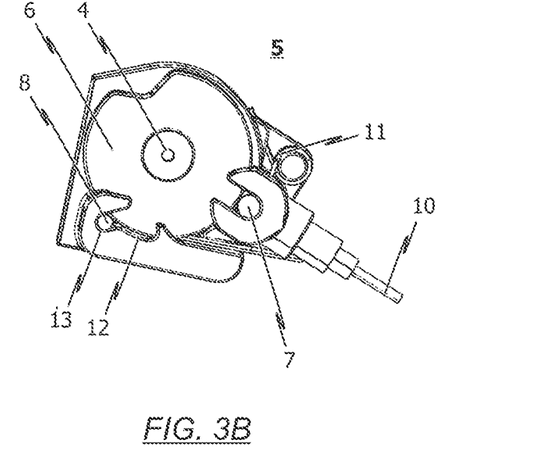
FIG. 3B schematically, a plan view of the gearing mechanism according to FIG. 3A, namely in a state in which the rotatably mounted cam carrier of the gearing mechanism is rotated by a first rotational angle range.
Figure 4A:
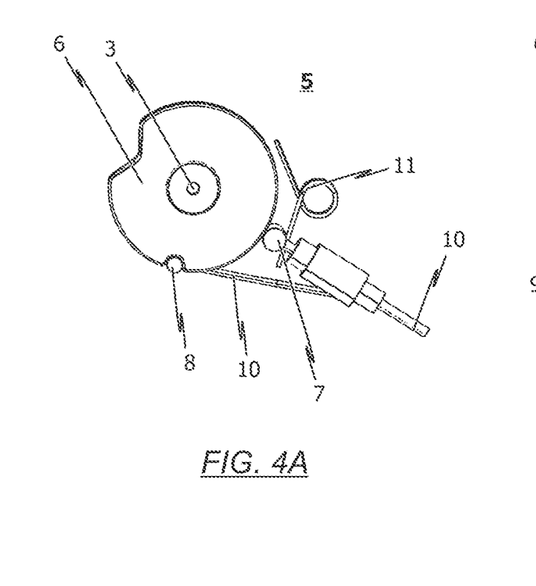
FIG. 4A schematically and in a plan view, components of the gearing mechanism according to FIG. 3A in the initial rotational position.
Figure 4B:
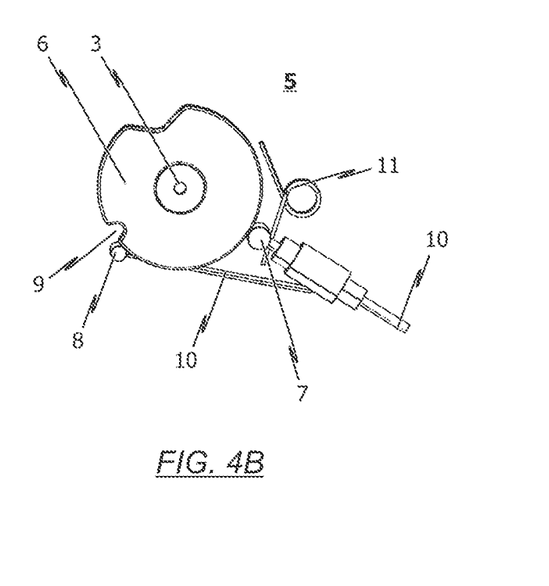
FIG. 4B schematically and in a plan view, components of the gearing mechanism according to FIG. 3B after the rotatably mounted cam carrier has been rotated about the first rotational angle range.

During a rotation of the rotatably mounted cam carrier 6 about a first rotational angle range and proceeding from the initial rotational position, as shown in the illustrations in FIG. 3B and FIG. 4B, the driver element 8 can be taken along by the associated driver 9 of the cam carrier 6 and transferred into the free movement region 13 of the positive guide 12. At the same time, the pick-off element 7 lies against the edge region of the cam carrier 6 in a first position.

Figure 3C:
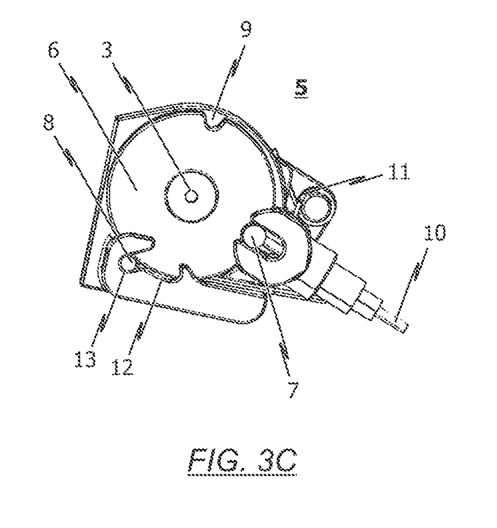
FIG. 3C schematically and in a plan view, the gearing mechanism according to FIG. 3A, namely in a state in which the rotatably mounted cam carrier of the gearing mechanism is rotated by a second rotational angle range.
Figure 3D:
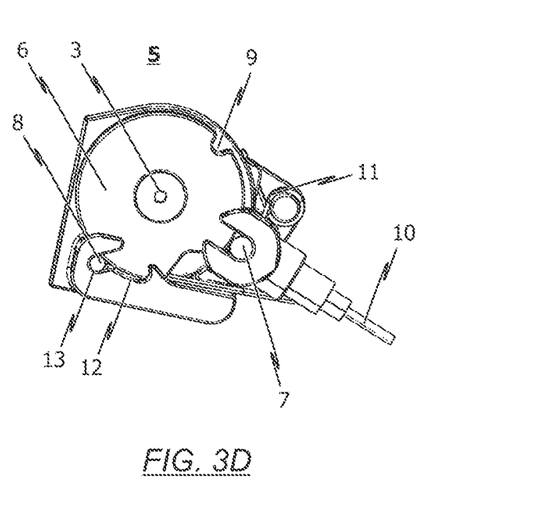
FIG. 3D schematically and in a plan view, the gearing mechanism according to FIG. 3A, namely in a state in which the rotatably mounted cam carrier of the gearing mechanism is rotated by a third rotational angle range.
Figure 4C:
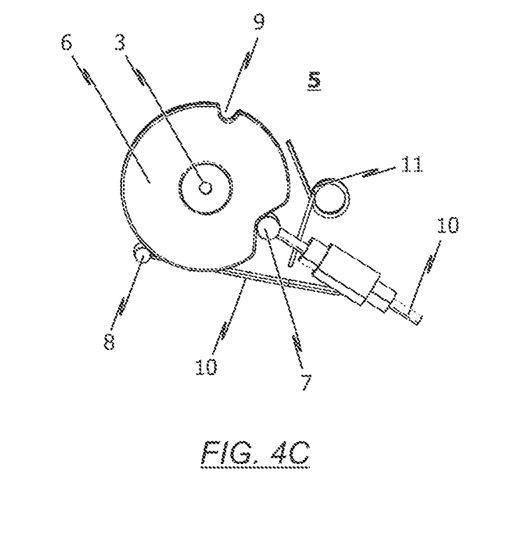
FIG. 4C schematically and in a plan view, components of the gearing mechanism according to FIG. 3C, namely in a state in which the rotatably mounted cam carrier is rotated about the second rotational angle range.
Figure 4D:
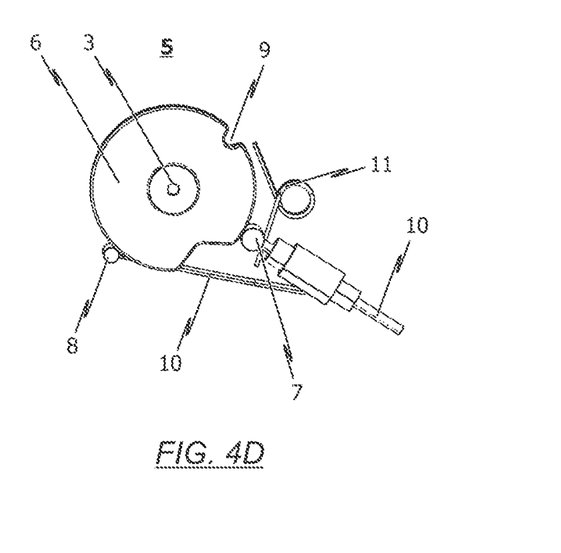
FIG. 4D schematically and in a plan view, the gearing mechanism according to FIG. 3D, namely in a state in which the rotatably mounted cam carrier is rotated about the third rotational angle range.

During a further rotation of the rotatably mounted cam carrier 6 about a second rotational angle range, as shown in the illustrations in FIG. 3C and FIG. 4C, the drive element 8 remains in the free movement region 13 of the positive guide 12, while the pick-off element 7 lies, in a second position which is different from the first position, against an edge region of the cam carrier 6.

During a further rotation of the rotatably mounted cam carrier 6 about a third rotational angle range (cf. FIG. 3D and FIG. 4D), the drive element 8 lies in the free movement region 13 of the positive guide 12, while the pick-off element 7 lies, again in the first position, against the edge region of the cam carrier 6.

Specifically, it is provided here that, it is conceivable that the rotatably mounted cam carrier 6 of the gearing mechanism 5 is designed as a cam disk which has a first region with a non-uniform edge, the contour of which is continuously followed by the pick-off element 7 when the cam carrier 6 designed as a cam disk rotates, wherein the cam carrier 6 designed as a cam disk has a second region preferably with a uniform edge, wherein the at least one driver 9 is formed in the second region for the driver element 8.

In the exemplary embodiment shown in the drawings, the driver element 8 is used in order to manipulate a flap unlocking/flap locking mechanism of the charging and/or filler-neck compartment system. This flap unlocking/flap locking mechanism serves for unlocking/releasing or locking/blocking the cover of the charging and/or filler-neck compartment system in the closed state in accordance with requirement. Here, the gearing mechanism 5, and in particular the drive element 8 of the gearing mechanism 5, is configured in order to convert a torque generated by the drive element 2 into a preferably translational force upon rotation of the drive shaft 3 of the drive element 2 and upon corresponding rotation of the rotatably mounted cam carrier 6, in order to manipulate, i.e. to unlock, the flap unlocking/flap locking mechanism accordingly.

On the other hand, in the embodiment of the gearing mechanism 5 shown schematically in the drawings, the pick-off element 7 is used in order to manipulate a locking/unlocking mechanism associated with a charging connection or charging plug connector accommodated in a passage opening of the charging and/or filler-neck compartment in accordance with requirement. The locking/unlocking mechanism serves in particular for the locking and/or blocking of the charging connection or charging plug connector in accordance with requirement.

Specifically, the gearing mechanism 5, and in particular the pick-off element 7 associated with the gearing mechanism 5, is configured in order to convert a torque generated by the drive element 2 into a preferably translational force for manipulating the locking/unlocking mechanism upon rotation of the drive shaft 3 of the drive element 2 and thus upon rotation of the rotatably mounted cam carrier 6.

Figure 5A:
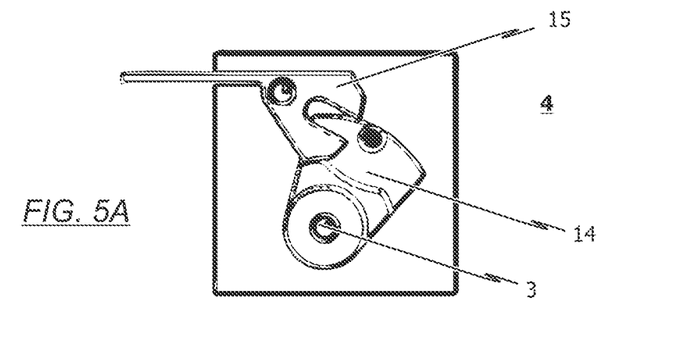
FIG. 5A-5C schematically, an alternative embodiment of a mechanical control or switching mechanism of the device according to the invention.
Figure 5B:
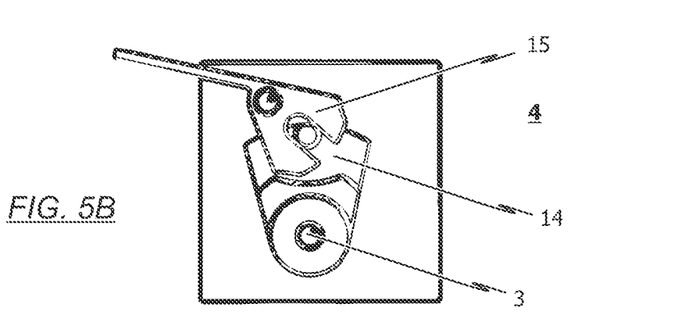
Figure 5C:
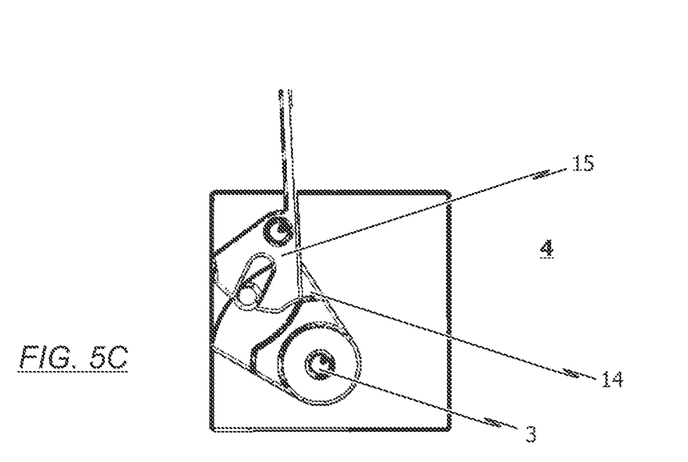

In FIG. 5A to FIG. 5C, an alternative embodiment of a mechanical control or switching mechanism 4 is shown.

In this embodiment, it is provided that the mechanical control or shifting mechanism 4 comprises a gearing mechanism 5, in particular designed as a coupling gearing, having a crank 14 and a type of rocker 15, wherein the crank 14 is driven or drivable in rotation by the drive shaft 3 of the drive element 2.

Depending on a rotational angle of the crank 14, as can be seen from the sequence in FIGS. 5A to 5C, a coupling between the crank 14 and the rocker 16 is at least temporarily eliminated.

Figure 6A:
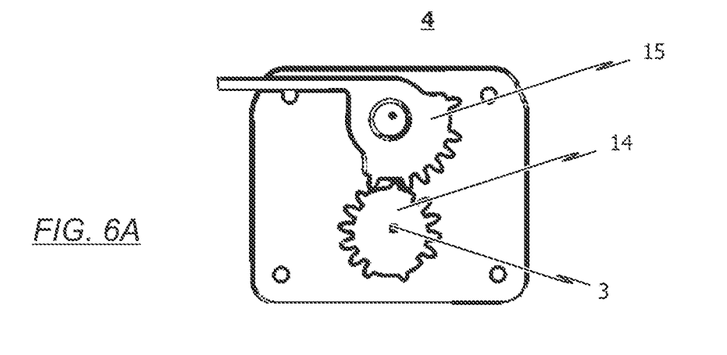
FIG. 6A-6C schematically, an alternative embodiment of a mechanical control or switching mechanism of the device according to the invention.
Figure 6B:
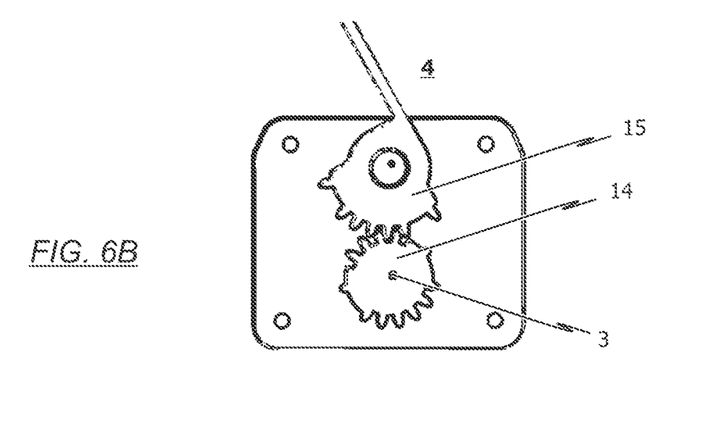
Figure 6C:
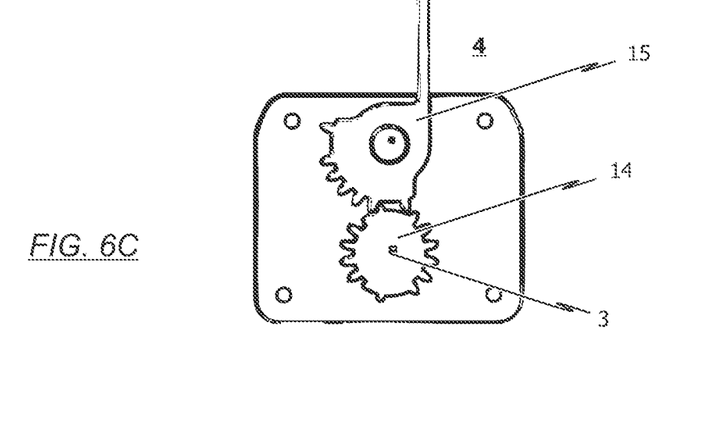

In FIG. 6A to 6C, an alternative embodiment of a gearing mechanism 5 embodied as a coupling gearing is provided. In this embodiment, a coupling between the crank 14 and the rocker 16 takes place via a partially interrupted toothing, as a result of which a coupling between the crank 14 and the rocker 15 is at least temporarily eliminated depending on a rotational angle of the crank 14.

Figure 7:
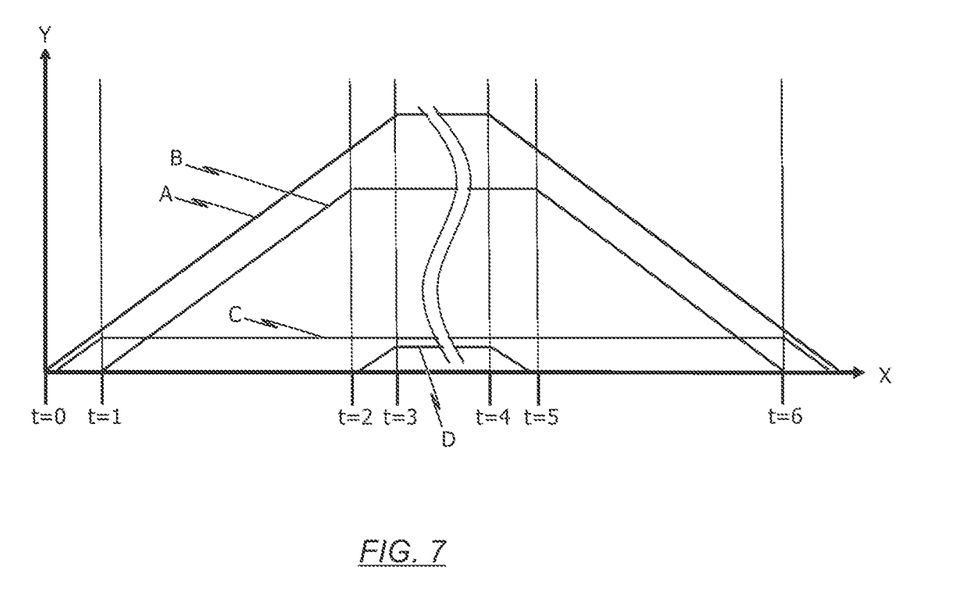
FIG. 7 schematically, a temporal sequence of the functions switchable or actuable with the device according to the invention.

FIG. 7 schematically shows a temporal sequence of the functions that are switchable or actuable with the device according to the invention. In the illustration in FIG. 7, the Y-axis denotes a rotational angle or path of a cover that is movable relative to a charging and/or filler-neck compartment as well as the actuating path, which is picked off by the mechanical control or switching mechanism 4 of a drive shaft 3 of a motor drive 2 for manipulating functional components of a charging and/or filler-neck compartment system. The X-axis shows the time.

The path marked with the reference numeral "A" corresponds to the rotational angle or the number of rotations of the drive shaft 3 of the electromotive drive element 2. The curve profile denoted by reference number "B" shows the rotational angle of the cover of the charging and/or filler-neck compartment system relative to the charging and/or filler-neck compartment.

The path denoted by reference number "C" shows the path generated by the mechanical control or switching mechanism 4 for manipulating the flap unlocking/flap locking mechanism of the charging and/or filler-neck compartment system.

The path indicated by reference number "D" shows the path generated by the mechanical control or switching mechanism 4 for manipulating the locking/unlocking mechanism of the charging and/or filler-neck compartment system.

In particular, FIG. 7 shows that the individual functions of the charging and/or filler-neck compartment system are coordinated with one another and actuated/manipulated according to a preset or presettable event sequence.

Proceeding from an initial position of the drive shaft 3 (at time t=0), a force necessary for manipulating the flap unlocking/flap locking mechanism is generated by the mechanical control or switching mechanism 4 during a first number of rotations or during a first rotational angle of the drive shaft 3 of the electric drive 2.

At time t=1, the cover of the charging and/or filler-neck compartment system is then unlocked. Then, i.e. from the time t=1 to the time t=2, the drive shaft 3 rotates about a second rotational angle or with a second number of rotations. During this period of time, the mechanical control or switching mechanism 4 is decoupled from the drive shaft 3. However, the cover is manipulated with the drive shaft 3 in order to be transferred into its open state.

At time t=2, the mechanical control or switching mechanism 4 is re-coupled to the drive shaft 3 of the electromotive drive 2, wherein, however, the mechanical control or switching mechanism 4 is de-coupled from the cover actuation mechanism. In other words, in the time period t=2 to t=3, the drive shaft 3 rotates about a third rotational angle or with a third number of rotations. During this time period, a force necessary for manipulating the locking/unlocking mechanism is generated by the mechanical control or switching mechanism 4, and, for example, a charging plug inserted into the filler-neck compartment is locked.

In the time period t=3 to t=4, the electromotive drive is not activated.

In the time period t=4 to t=5, the drive shaft of the electromotive drive rotates by a fourth number of rotations or about a fourth rotational angle, respectively. In particular, at time t=4, the rotational direction of the drive shaft changes. The mechanical control or switching mechanism 4 is coupled to the drive shaft 3 in the time period t=4 to t=5 and again generates a force necessary for manipulating the locking/unlocking mechanism. Specifically, the charging plug, for example, is unlocked in the period t=4 to t=5.

Subsequently, i.e. in the time period t=5 to t=6, the mechanical control or switching mechanism 4 is decoupled from the drive shaft 3 and, due to the rotation of the drive shaft 3, the cover of the charging and/or filler-neck compartment system is closed during this time period. Between the time period t=6 and t=7, only the mechanical control or switching mechanism 4 is coupled to the drive shaft, and thereby a force necessary to manipulate the flap unlocking/flap locking mechanism is generated in order to lock or block the cover accordingly.

The invention is not limited to the embodiments shown in the drawings, but rather results when all of the features disclosed herein are considered together.

In particular, the present invention also relates to a charging and/or filler-neck compartment system for a vehicle, wherein the charging and/or filler-neck compartment system has a charging and/or filler-neck compartment and a cover which is movable relative to the charging and/or filler-neck compartment, and wherein the charging and/or filler-neck compartment system furthermore has a device 1 of the aforementioned kind according to the invention for switching and actuating multiple functions of the charging and/or filler-neck compartment system.

LIST OF REFERENCE NUMERALS

1 Device for switching and actuating multiple functions of a charging and/or filler-neck compartment system
2 Drive element
3 Drive shaft
4 Control or switching mechanism
5 Gearing mechanism
6 Cam carrier
7 Pick-off element
8 Driver element
9 Driver
10 Force-transmitting element
11 Preloading element
12 Positive guide
13 Free movement region of the positive guide
14 Crank
15 Rocker

The invention claimed is:

1. A device for switching and actuating multiple functions of a charging and/or filler-neck compartment system of a vehicle, wherein the charging and/or filler-neck compartment system has a charging and/or filler-neck compartment and a cover which is movable relative to the charging and/or filler-neck compartment, and wherein the device comprises:
   a drive element with a drive shaft, wherein the drive shaft is operatively connected to the cover such that, when the drive shaft rotates, the cover is movable relative to the charging and/or filler-neck compartment; and
   a mechanical control or switching mechanism, wherein the mechanical control or switching mechanism is designed such that, when the drive shaft rotates, a rotational movement of the drive shaft can be picked off by the mechanical control or switching mechanism for the purposes of manipulating at least one functional component of the charging and/or filler-neck compartment system;
wherein:
   the charging and/or filler-neck compartment system has a flap unlocking/flap locking mechanism for locking and/or blocking the cover in its closed state, wherein the mechanical control or switching mechanism is designed to, when the drive shaft of the drive element rotates, convert a torque generated by the drive element into a translational force so as to manipulate the flap unlocking/flap locking mechanism; or
   the charging and/or filler-neck compartment system has a charging connection, charging plug connector and/or filler neck accommodated in a passage opening of the charging and/or filler-neck compartment and has a correspondingly associated locking/unlocking mechanism for locking/blocking or unlocking/releasing the charging connection, charging plug connector and/or filler neck, wherein the mechanical control or switching mechanism is designed to, when the drive shaft of the drive element rotates, convert a torque generated by the drive element into a translational force so as to manipulate the locking/unlocking mechanism; or
   the charging and/or filler-neck compartment system has an illumination device with a correspondingly associated switch for activating and deactivating the illumination device, wherein the mechanical control or switching mechanism is designed to, when the drive shaft of the drive element rotates, convert a torque generated by the drive element into a translational force so as to manipulate the switch;
wherein the drive shaft is operatively connected to the cover, and the mechanical control or switching mechanism is configured such that:
   proceeding from an initial position of the drive shaft, during a first number of rotations or through a first rotational angle of the drive shaft, the mechanical control or switching mechanism generates a force required for manipulating the flap unlocking/flap locking mechanism, and
   only after the first number of rotations or after the first rotational angle of the drive shaft and only during an immediately subsequent second number of rotations or through a second rotational angle of the drive shaft, the cover is moved relative to the charging and/or filler-neck compartment, and only after the second number of rotations or only after the second rotational angle of the drive shaft and during an immediately subsequent third number of rotations or through a third rotational angle of the drive shaft, the mechanical control or switching mechanism generates a force required for manipulating the locking/unlocking mechanism.

2. A device for switching and actuating multiple functions of a charging and/or filler-neck compartment system of a vehicle, wherein the charging and/or filler-neck compartment system has a charging and/or filler-neck compartment and a cover which is movable relative to the charging and/or filler-neck compartment, and wherein the device comprises:

a drive element with a drive shaft, wherein the drive shaft is operatively connected to the cover such that, when the drive shaft rotates, the cover is movable relative to the charging and/or filler-neck compartment; and a mechanical control or switching mechanism, wherein the mechanical control or switching mechanism is designed such that, when the drive shaft rotates, a rotational movement of the drive shaft can be picked off by the mechanical control or switching mechanism for the purposes of manipulating at least one functional component of the charging and/or filler-neck compartment system;

wherein:

the charging and/or filler-neck compartment system has a flap unlocking/flap locking mechanism for locking and/or blocking the cover in its closed state, wherein the mechanical control or switching mechanism is designed to, when the drive shaft of the drive element rotates, convert a torque generated by the drive element into a translational force so as to manipulate the flap unlocking/flap locking mechanism; and/or the charging and/or filler-neck compartment system has a charging connection, charging plug connector and/or filler neck accommodated in a passage opening of the charging and/or filler-neck compartment and has a correspondingly associated locking/unlocking mechanism for locking/blocking or unlocking/releasing the charging connection, charging plug connector and/or filler neck, wherein the mechanical control or switching mechanism is designed to, when the drive shaft of the drive element rotates, convert a torque generated by the drive element into a translational force so as to manipulate the locking/unlocking mechanism; and/or the charging and/or filler-neck compartment system has an illumination device with a correspondingly associated switch for activating and deactivating the illumination device, wherein the mechanical control or switching mechanism is designed to, when the drive shaft of the drive element rotates, convert a torque generated by the drive element into a translational force so as to manipulate the switch;

wherein the mechanical control or switching mechanism is designed to generate the force required for manipulating the flap unlocking/flap locking mechanism and/or the force required for manipulating the locking/unlocking mechanism and/or the force required for manipulating the switch in a manner dependent on a rotational angle and/or a number of rotations of the drive shaft of the drive element;

wherein the mechanical control or switching mechanism is designed to generate the force required for manipulating the flap unlocking/flap locking mechanism and the force required for manipulating the locking/unlocking mechanism and the force required for manipulating the switch in each case in a manner dependent on a rotational angle and/or a number of rotations of the drive shaft of the drive element.

3. The device as claimed in claim 1, wherein the drive shaft is operatively connected to the cover and the mechanical control or switching mechanism is designed such that, during a fourth number of rotations, which is immediately subsequent to the third number or the third rotational angle, or through a fourth rotational angle of the drive shaft, the mechanical control or switching mechanism again generates a force required for manipulating the locking/unlocking mechanism, that, only after the fourth number of rotations or only after the fourth rotational angle of the drive shaft and only during an immediately subsequent fifth number of rotations or through a fifth rotational angle of the drive shaft, the cover is again moved relative to the charging and/or filler-neck compartment, and that, during an immediately subsequent sixth number of rotations or through a sixth rotational angle of the drive shaft, the mechanical control or switching mechanism again generates a force required for manipulating the flap unlocking/flap locking mechanism.

4. The device as claimed in claim 1, wherein the mechanical control or switching mechanism has a gearing mechanism which is designed as a coupling gearing and which has a crank and a rocker, wherein the crank is driven or drivable in rotation by the drive shaft of the drive element, and wherein a coupling between the crank and the rocker is at least intermittently eliminated in a manner dependent on a rotational angle of the crank.

5. A device for switching and actuating multiple functions of a charging and/or filler-neck compartment system of a vehicle, wherein the charging and/or filler-neck compartment system has a charging and/or filler-neck compartment and a cover which is movable relative to the charging and/or filler-neck compartment, and wherein the device comprises:

a drive element with a drive shaft, wherein the drive shaft is operatively connected to the cover such that, when the drive shaft rotates, the cover is movable relative to the charging and/or filler-neck compartment; and a mechanical control or switching mechanism, wherein the mechanical control or switching mechanism is designed such that, when the drive shaft rotates, a rotational movement of the drive shaft can be picked off by the mechanical control or switching mechanism for the purposes of manipulating at least one functional component of the charging and/or filler-neck compartment system;

wherein the mechanical control or switching mechanism has a gearing mechanism with at least one rotatably mounted cam carrier which, when the drive element is actuated, is driven or drivable in rotation by the drive shaft of the drive element, and wherein the gearing mechanism furthermore has at least one pick-off element which is mounted such that it continuously follows an outer peripheral contour of the at least one rotatably mounted cam carrier in order to generate an output movement required for the manipulation of a functional component of the charging and/or filler-neck compartment system, wherein, the gearing mechanism has, for each functional component, which is to be manipulated a correspondingly associated pick-off element which is mounted such that it continuously follows the outer peripheral contour of the at least one rotatably mounted cam carrier in order to generate an output movement of the functional component;

wherein the at least one rotatably mounted cam carrier is in the form of a cam disk, and wherein the at least one cam carrier has at least one driver, wherein the gearing mechanism furthermore has at least one driver element which is at least regionally of complementary design with respect to the at least one driver and which is associated with the at least one driver, wherein the at least one driver element associated with the at least one driver is mounted and arranged in relation to the at least one cam carrier such that the at least one driver element is in engagement with the associated driver only in a preset or presettable rotational angle range of the at least one cam carrier;

wherein:

the at least one driver element is assigned a positive guide for guiding a movement of the driver element when the latter is driven along by the associated driver in the preset or presettable rotational angle range when the at least one cam carrier rotates, wherein the positive guide is designed as a slotted or sliding-block guide, and/or wherein the positive guide has a free movement region in which the driver element associated with the at least one driver is held when the driver element is not in engagement with the at least one associated driver;

and/or wherein the at least one driver element is connected to a force-transmitting element, in the form of a rod, a cable pull and/or a Bowden cable, for transmitting tensile and/or compressive forces from the at least one driver element to the functional component that is to be manipulated.

6. The device as claimed in claim 5,
wherein the at least one pick-off element is assigned a preloading element, in the form of a compression spring, for preloading the pick-off element in the direction of the cam carrier.

7. The device as claimed in claim 5, wherein, in an initial rotational position of the at least one rotatably mounted cam carrier, the at least one driver element is in engagement with the at least one driver of the cam carrier and the at least one pick-off element lies, in a first position, against an edge region of the cam carrier, wherein, during a rotation of the rotatably mounted cam carrier through a first rotational angle range and proceeding from the initial rotational position, the at least one driver element is driven along by the associated driver and is transferred into a free movement region of a positive guide while the at least one pick-off element lies, in its first position, against the edge region of the cam carrier, wherein, during a further rotation of the rotatably mounted cam carrier through a second rotational angle range, the at least one driver element remains in the free movement region of the positive guide while the at least one pick-off element lies, in a second position, against an edge region of the cam carrier, and wherein, during a further rotation of the rotatably mounted cam carrier through a third rotational angle range, the at least one driver element is situated in the free movement region of the positive guide and the at least one pick-off element lies, again in the first position, against the edge region of the cam carrier.

8. The device as claimed in claim 7, wherein the at least one rotatably mounted cam carrier is designed as a cam disk which has a first region with a non-uniform edge, the outer peripheral contour of which is continuously followed by the at least one pick-off element when the cam carrier designed as a cam disk rotates, and wherein the cam carrier designed as a cam disk has a second region with a uniform edge, wherein the at least one driver is formed in the second region.

9. A charging and/or filler-neck compartment system for a vehicle, wherein the charging and/or filler-neck compartment system has a charging and/or filler-neck compartment and a cover which is movable relative to the charging and/or filler-neck compartment, and wherein the charging and/or filler-neck compartment system furthermore has a device as claimed in claim 1 for switching and actuating multiple functions or functional components of the charging and/or filler-neck compartment system.

10. The device as claimed in claim 5,
wherein the mechanical control or switching mechanism is designed to, when the drive shaft rotates, convert a torque generated by the drive element into a translational force so as to manipulate at least one functional component of the charging and/or filler-neck compartment system.

11. The device as claimed in claim 5,
wherein the mechanical control or switching mechanism is designed to coordinate the manipulation of the at least one functional component in accordance with a preset or presettable event sequence, with the movement of the cover relative to the charging and/or filler-neck compartment, wherein the mechanical control or switching mechanism is designed to move the cover relative to the charging and/or filler-neck compartment, and/or manipulate the at least one functional component, in a manner dependent on a rotational angle and/or a number of rotations of the drive shaft.

12. The device as claimed in claim 5, wherein:
the charging and/or filler-neck compartment system has a flap unlocking/flap locking mechanism for locking and/or blocking the cover in its closed state, wherein the mechanical control or switching mechanism is designed to, when the drive shaft of the drive element rotates, convert a torque generated by the drive element into a translational force for the purposes of manipulating the flap unlocking/flap locking mechanism; or the charging and/or filler-neck compartment system has a charging connection, charging plug connector and/or filler neck accommodated in a passage opening of the charging and/or filler-neck compartment and has a correspondingly associated locking/unlocking mechanism for locking/blocking or unlocking/releasing the charging connection, charging plug connector and/or filler neck, wherein the mechanical control or switching mechanism is designed to, when the drive shaft of the drive element rotates, convert a torque generated by the drive element into a translational force for the purposes of manipulating the locking/unlocking mechanism; or the charging and/or filler-neck compartment system has an illumination device with a correspondingly associated switch for activating and deactivating the illumination device, wherein the mechanical control or switching mechanism is designed to, when the drive shaft of the drive element rotates, convert a torque generated by the drive element into a translational force for the purposes of manipulating the switch.

13. The device as claimed in claim 5,
wherein the mechanical control or switching mechanism is designed to generate the force required for manipulating the flap unlocking/flap locking mechanism and/or the force required for manipulating the locking/unlocking mechanism and/or the force required for manipulating the switch in a manner dependent on a rotational angle and/or a number of rotations of the drive shaft of the drive element.

14. The device according to claim 13, wherein the drive shaft is operatively connected to the cover and the mechanical control or switching mechanism is designed such that, proceeding from an initial position of the drive shaft, during a first number of rotations or through a first rotational angle of the drive shaft, the mechanical control or switching mechanism generates a force required for manipulating the flap unlocking/flap locking mechanism, that, only after the first number of rotations or after the first rotational angle of the drive shaft and only during an immediately subsequent second number of rotations or through a second rotational angle of the drive shaft, the cover is moved relative to the charging and/or filler-neck compartment, and that, only after the second number of rotations or only after the second rotational angle of the drive shaft and during an immediately subsequent third number of rotations or through a third rotational angle of the drive shaft, the mechanical control or switching mechanism generates a force required for manipulating the locking/unlocking mechanism.

15. The device as claimed in claim 14,
wherein the drive shaft is operatively connected to the cover and the mechanical control or switching mechanism is designed such that, during a fourth number of rotations, which is immediately subsequent to the third number or the third rotational angle, or through a fourth rotational angle of the drive shaft, the mechanical control or switching mechanism again generates a force required for manipulating the locking/unlocking mechanism, that, only after the fourth number of rotations or only after the fourth rotational angle of the drive shaft and only during an immediately subsequent fifth number of rotations or through a fifth rotational angle of the drive shaft, the cover is again moved relative to the charging and/or filler-neck compartment, and that, during an immediately subsequent sixth number of rotations or through a sixth rotational angle of the drive shaft, the mechanical control or switching mechanism again generates a force required for manipulating the flap unlocking/flap locking mechanism.

16. A charging and/or filler-neck compartment system for a vehicle, wherein the charging and/or filler-neck compartment system has a charging and/or filler-neck compartment and a cover which is movable relative to the charging and/or filler-neck compartment, and wherein the charging and/or filler-neck compartment system furthermore has a device as claimed in claim 5 for switching and actuating multiple functions or functional components of the charging and/or filler-neck compartment system.

* * * * *